United States Patent
Berlin et al.

(10) Patent No.: US 10,292,056 B2
(45) Date of Patent: *May 14, 2019

(54) MONITORING NON-SUPPORTED WIRELESS SPECTRUM WITHIN COVERAGE AREAS OF DISTRIBUTED ANTENNA SYSTEMS (DASS)

(71) Applicant: Corning Optical Communications Wireless Ltd, Airport City (IL)

(72) Inventors: Igor Berlin, Potomac, MD (US); Liav Moshe Daniel, Gedera (IL); Yoni Henia, Mazkeret Barya (IL); Rami Reuven, Rishon Letzion (IL); Motti Yakobi, Be'er Tuvia (IL)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,007

(22) Filed: May 8, 2018

(65) Prior Publication Data

US 2018/0262917 A1 Sep. 13, 2018

Related U.S. Application Data

(63) Continuation of application No. 15/350,503, filed on Nov. 14, 2016, now Pat. No. 9,967,754, which is a
(Continued)

(51) Int. Cl.
*H04W 16/26* (2009.01)
*H04W 72/04* (2009.01)
(Continued)

(52) U.S. Cl.
CPC ...... *H04W 16/26* (2013.01); *H04B 10/25753* (2013.01); *H04W 24/02* (2013.01);
(Continued)

(58) Field of Classification Search
CPC ..... H04W 16/26; H04W 24/08; H04W 24/02; H04W 72/0453; H04B 10/25753
See application file for complete search history.

(56) References Cited

U.S. PATENT DOCUMENTS

| 3,663,762 A | 5/1972 | Joel, Jr. |
| 4,365,865 A | 12/1982 | Stiles |

(Continued)

FOREIGN PATENT DOCUMENTS

| AU | 645192 B | 10/1992 |
| AU | 731180 B2 | 3/1998 |

(Continued)

OTHER PUBLICATIONS

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
(Continued)

*Primary Examiner* — Ayodeji O Ayotunde
(74) *Attorney, Agent, or Firm* — C. Keith Montgomery

(57) ABSTRACT

Monitoring non-supported wireless spectrum within a coverage area of a distributed antenna system (DAS) in which a listening module connected to a remote unit of the DAS monitors non-supported wireless frequencies (i.e., frequencies that are outside the frequency ranges supported by the downlink and uplink signals of the DAS), via one or more antennas. The listening module also transmits the wireless frequencies to a monitoring module connected to head-end equipment (HEE) of the DAS. In that manner, a monitoring module can use an existing DAS infrastructure to monitor non-supported portions of the wireless spectrum at remote locations. In addition to avoiding the need to run a parallel DAS infrastructure, the disclosed arrangements are also
(Continued)

useful in shared spectrum environments and other environments where efficient spectrum utilization is desired.

18 Claims, 9 Drawing Sheets

Related U.S. Application Data continuation of application No. 14/972,149, filed on Dec. 17, 2015, now Pat. No. 9,526,020, which is a continuation of application No. 13/948,356, filed on Jul. 23, 2013, now Pat. No. 8,859,574.

(51) Int. Cl.
  *H04W 24/02* (2009.01)
  *H04W 24/08* (2009.01)
  *H04B 10/2575* (2013.01)
  *H04W 88/08* (2009.01)
  *H04W 84/12* (2009.01)

(52) U.S. Cl.
  CPC ....... *H04W 24/08* (2013.01); *H04W 72/0453* (2013.01); *H04W 84/12* (2013.01); *H04W 88/085* (2013.01)

(56) References Cited

U.S. PATENT DOCUMENTS

| | | |
|---|---|---|
| 4,449,246 A | 5/1984 | Seiler et al. |
| 4,573,212 A | 2/1986 | Lipsky |
| 4,665,560 A | 5/1987 | Lange |
| 4,812,851 A | 3/1989 | Giubardo |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |

(56) References Cited

U.S. PATENT DOCUMENTS

| | | |
|---|---|---|
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,472,952 B1 | 10/2002 | Sakai et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,529,715 B1 | 3/2003 | Kitko et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,570,913 B1 | 5/2003 | Chen |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |

(56) References Cited

U.S. PATENT DOCUMENTS

| | | |
|---|---|---|
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,489,641 B2 | 2/2009 | Miller et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,672,643 B2 | 3/2010 | Loh |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,756,480 B2 | 7/2010 | Loh |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |

(56) References Cited

U.S. PATENT DOCUMENTS

| | | |
|---|---|---|
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,175,535 B2 | 5/2012 | Mu |
| 8,213,401 B2 | 7/2012 | Fischer et al. |
| 8,223,795 B2 | 7/2012 | Cox et al. |
| 8,226,003 B2 | 7/2012 | Frederick et al. |
| 8,238,463 B1 | 8/2012 | Arslan et al. |
| 8,270,387 B2 | 9/2012 | Cannon et al. |
| 8,290,447 B2 | 10/2012 | Sutton et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,201 B1 | 4/2013 | McHann, Jr. et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,634,766 B2 | 1/2014 | Hobbs et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,903,346 B2 | 12/2014 | Fischer et al. |
| 8,909,133 B2 | 12/2014 | Hobbs et al. |
| 8,929,288 B2 | 1/2015 | Stewart et al. |
| 8,982,995 B1 | 3/2015 | Van Cal |
| 9,042,838 B2 | 5/2015 | Braithwaite |
| 9,178,635 B2 | 11/2015 | Ben-Shlomo |
| 9,203,462 B2 | 12/2015 | Petrovic et al. |
| 9,246,721 B1 | 1/2016 | Martinez |
| 9,385,763 B1 | 7/2016 | Shi et al. |
| 9,455,760 B1 | 9/2016 | Dick et al. |
| 9,526,020 B2 * | 12/2016 | Berlin ............... H04W 72/0453 |
| 9,807,700 B2 | 10/2017 | Harel |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Amon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0022645 A1 | 1/2003 | Runzo |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2003/0216129 A1 | 11/2003 | Khalil et al. |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0252786 A1 | 12/2004 | McHenry |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0085186 A1 | 4/2005 | Sandrin |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |

(56) References Cited

U.S. PATENT DOCUMENTS

| | | |
|---|---|---|
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0160550 A1 | 7/2006 | Edwards |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0254592 A1 | 11/2007 | McCallister et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0006194 A1 | 1/2009 | Sridharan et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0061940 A1 | 3/2009 | Scheinert et al. |
| 2009/0067402 A1 | 3/2009 | Forenza et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |

(56) References Cited

U.S. PATENT DOCUMENTS

| | | |
|---|---|---|
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0131214 A1 | 5/2010 | Seely et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0227575 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026844 A1 | 2/2011 | Francois et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0099490 A1 | 4/2012 | Kummetz et al. |
| 2012/0100813 A1 | 4/2012 | Mow et al. |
| 2012/0155572 A1 | 6/2012 | Kim et al. |
| 2012/0177026 A1 | 7/2012 | Uyehara et al. |
| 2013/0012195 A1 | 1/2013 | Sabat, Jr. et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2013/0273854 A1 | 10/2013 | Zhang et al. |
| 2013/0295980 A1 | 11/2013 | Reuven et al. |
| 2014/0016583 A1 | 1/2014 | Smith |
| 2014/0037292 A1 | 2/2014 | Stapleton et al. |
| 2014/0072064 A1 | 3/2014 | Lemson et al. |
| 2014/0112667 A1 | 4/2014 | Neukirch et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2014/0341315 A1 | 11/2014 | Cova |
| 2015/0016441 A1 | 1/2015 | Hanson et al. |
| 2015/0031316 A1 | 1/2015 | Berlin et al. |
| 2015/0061762 A1 | 3/2015 | Charlon et al. |
| 2015/0063323 A1 | 3/2015 | Sadek et al. |
| 2015/0171878 A1 | 6/2015 | Schafferer et al. |
| 2015/0195055 A1 | 7/2015 | Ben-Shlomo |
| 2015/0229386 A1 | 8/2015 | Lange |
| 2016/0088569 A1 | 3/2016 | Frank et al. |
| 2016/0094267 A1 | 3/2016 | Petrovic et al. |
| 2016/0105816 A1 | 4/2016 | Berlin et al. |
| 2016/0134325 A1 | 5/2016 | Tageman et al. |
| 2016/0212640 A1 | 7/2016 | Kim |
| 2016/0226653 A1 | 8/2016 | Bharadia et al. |
| 2016/0249346 A1 | 8/2016 | Harel |
| 2016/0301436 A1 | 10/2016 | Zou et al. |
| 2016/0329631 A1 | 11/2016 | Rheinfelder et al. |
| 2016/0352497 A1 | 12/2016 | Daniel |
| 2017/0064565 A1 | 3/2017 | Berlin et al. |
| 2017/0135058 A1 | 5/2017 | Ghannouchi et al. |
| 2017/0208622 A1 | 7/2017 | Mizrahi et al. |
| 2017/0288716 A1 | 10/2017 | Daniel et al. |
| 2017/0318561 A1 | 11/2017 | Harel et al. |
| 2017/0331599 A1 | 11/2017 | Tang et al. |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |

(56) References Cited

FOREIGN PATENT DOCUMENTS

| | | |
|---|---|---|
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2081334 A1 | 7/2009 |
| EP | 2276298 A1 | 1/2011 |
| EP | 1570626 B1 | 11/2013 |
| EP | 3166231 A1 | 4/2016 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9729608 A1 | 8/1997 |
| WO | 9810600 A1 | 3/1998 |
| WO | 00042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02091599 A2 | 11/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2009029077 A1 | 3/2009 |
| WO | 2006046088 A1 | 5/2009 |
| WO | 2010022156 A2 | 2/2010 |
| WO | 2010090999 A1 | 8/2010 |
| WO | 2010126667 A1 | 11/2010 |
| WO | 2010132739 A1 | 11/2010 |
| WO | 2010151849 A2 | 12/2010 |
| WO | 2011023592 A1 | 3/2011 |
| WO | 2011100095 A1 | 8/2011 |
| WO | 2011139939 A1 | 11/2011 |
| WO | 2012058061 A1 | 5/2012 |
| WO | 2012148938 A1 | 11/2012 |
| WO | 2012148940 A1 | 11/2012 |
| WO | 2013028197 A1 | 2/2013 |
| WO | 2013096563 A1 | 6/2013 |
| WO | 2013122915 A1 | 8/2013 |
| WO | 2014072947 A1 | 5/2014 |
| WO | 2015011702 A1 | 1/2015 |
| WO | 2015089719 A1 | 6/2015 |
| WO | 2015183791 A1 | 12/2015 |
| WO | 2016124248 A1 | 8/2016 |

OTHER PUBLICATIONS

Biton et al., "Challenge: CeTV and Ca—Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.

Non-Final Office Action for U.S. Appl. No. 13/948,536, dated Jan. 16, 2015, 13 pages.

International Search Report for PCT/IL2014/050657, dated Dec. 1, 2014, 4 pages.

Notice of Allowance for U.S. Appl. No. 13/948,536, dated May 28, 2015, 9 pages.

Notice of Allowance for U.S. Appl. No. 13/948,536, dated Oct. 7, 2015, 7 pages.

Notice of Allowance for U.S. Appl. No. 14/146,964, dated Jul. 14, 2015, 9 pages.

Author Unknown, "DECT: The standard explained," DECT Forum, Feb. 1997, Solothurn, Switzerland, 16 pages.

Tekmar Sistemi s.r.l., "Definition of Wideband Distribution Systems," R4-020721, TSG-RAN Working Group 4 (Radio), meeting #23, Gyeongju, Korea, May 13-17, 2002, 12 pages.

International Search Report for PCT/US2013/038843 dated Jul. 18, 2013, 4 pages.

Non-final Office Action for U.S. Appl. No. 13/873,927 dated Aug. 14, 2015, 19 pages.

Final Office Action for U.S. Appl. No. 13/873,927 dated Feb. 8, 2016, 24 pages.

Advisory Action for U.S. Appl. No. 13/873,927 dated Apr. 14, 2016, 3 pages.

Non-final Office Action for U.S. Appl. No. 13/873,927 dated May 12, 2016, 23 pages.

Notice of Allowance for U.S. Appl. No. 13/873,927, dated Nov. 4, 2016, 8 pages.

Non-final Office Action for U.S. Appl. No. 14/972,149, dated Apr. 7, 2016, 9 pages.

Notice of Allowance for U.S. Appl. No. 14/972,149, dated Aug. 15, 2016, 9 pages.

Non-Final Office Action for U.S. Appl. No. 15/042,532, dated Sep. 30, 2016, 13 pages.

Author Unknown, "Fiber Optic Distributed Antenna System," Installation and Users Guide, ERAU Version 1.5, May 2002, Andrews Corporation, 53 pages.

Notice of Allowance for U.S. Appl. No. 13/873,927, dated Mar. 10, 2017, 8 pages.

(56) References Cited

OTHER PUBLICATIONS

Final Office Action for U.S. Appl. No. 15/042,532, dated Mar. 17, 2017, 16 pages.
Final Office Action for U.S. Appl. No. 15/086,861, dated May 31, 2017, 14 pages.
Advisory Action for U.S. Appl. No. 15/086,861, dated Aug. 30, 2017, 3 pages.
Non-Final Office Action for U.S. Appl. No. 15/350,503, dated Jul. 3, 2017, 9 pages.
Non-Final Office Action for U.S. Appl. No. 15/086,861, dated Mar. 29, 2018, 12 pages.
Non-Final Office Action for U.S. Appl. No. 15/794,605, dated Apr. 19, 2018, 22 pages.
Notice of Allowance for U.S. Appl. No. 15/350,503, dated Jan. 10, 2018, 8 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.
Cooper, A.J., "Fiber/Radio for the Provision of Cordless/Mobile Telephony Services in the Access Network," Electronics Letters, 1990, pp. 2054-2056, vol. 26.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.

(56) References Cited

OTHER PUBLICATIONS

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.

Author Unknown, "VCSEL Chaotic Synchronization and Modulation Characteristics," Master's Thesis, Southwest Jiatong University, Professor Pan Wei, Apr. 2006, 8 pages (machine translation).

Notice of Allowance for U.S. Appl. No. 15/086,861, dated Nov. 2, 2018, 10 pages.

Final Office Action for U.S. Appl. No. 15/794,605, dated Oct. 26, 2018, 11 pages.

\* cited by examiner

US 10,292,056 B2

MONITORING NON-SUPPORTED WIRELESS SPECTRUM WITHIN COVERAGE AREAS OF DISTRIBUTED ANTENNA SYSTEMS (DASS)

PRIORITY APPLICATION

This is a continuation of U.S. application Ser. No. 15/350,503 filed on Nov. 14, 2016, now U.S. Pat. No. 9,967,754, which is a continuation of U.S. application Ser. No. 14/972,149, filed Dec. 17, 2015, now U.S. Pat. No. 9,526,020, which is a continuation of U.S. application Ser. No. 13/948,536, filed on Jul. 23, 2013, now U.S. Pat. No. 9,247,543, the contents of which are relied upon and incorporated herein by reference in their entireties, and the benefit of priority under 35 U.S.C. § 120 is hereby claimed.

BACKGROUND

The disclosure relates generally to distributed antenna systems (DASs) and more particularly to monitoring non-supported wireless spectrum, which may be used in connection with coverage areas of DASs.

DASs can be used for providing, extending and enhancing wireless communications and other services within a building or other installation. One approach to deploying a DAS involves the use of radio frequency (RF) antenna coverage areas, also referred to as "antenna coverage areas." The antenna coverage areas are provided by remote units in the DAS. Remote units can provide antenna coverage areas having radii in the range from a few meters up to twenty (20) meters. If the antenna coverage areas provided each cover a small area, there are typically only a few users (clients) per antenna coverage area. This minimizes the amount of RF bandwidth shared among the wireless system users. It may be desirable to provide antenna coverage areas in a building or other facility to provide indoor DAS access to clients within the facility. An optical fiber-based DAS can be used to distribute RF communications signals via Radio-over-Fiber (RoF) distribution.

Remote units in a DAS can be configured to distribute RF communications signals in multiple radio bands (i.e., frequencies or ranges of frequencies), as opposed to a single radio band. Distributing RF communications signals in multiple radio bands in an antenna coverage area increases flexibility of the DAS. In this scenario, client devices configured to communicate in different radio bands are supported in a given antenna coverage area provided by the remote unit.

The wireless spectrum within the antenna coverage areas often contain wireless signals from other sources and ambient electromagnetic (EM) signals, and in radio bands not supported by the DAS. These EM signals sometimes include supported frequencies used by DAS clients, as well as non-supported wireless frequencies. It may be desirable to detect and monitor non-supported environmental frequencies in the remote locations associated with the DAS remote units. In addition, some add-on equipment, such as a small-cell module physically located away from the remote unit, receives environmental frequency information as part of its initialization and configuration process, for example, to avoid interference with downlink or other channels of the small cell from environmental and other sources. Thus, it may also be desirable to detect and monitor non-supported wireless frequencies when adding or configuring additional equipment connected to the DAS.

No admission is made that any reference cited herein constitutes prior art. Applicant expressly reserves the right to challenge the accuracy and pertinency of any cited documents.

SUMMARY

Embodiments of the disclosure relate to monitoring non-supported wireless spectrum within coverage areas of a distributed antenna system (DAS). Related devices and methods are also disclosed. Non-supported wireless spectrum refers to wireless frequencies that do not correspond to the one or more wireless services of the DAS, and may also be referred to as out-of-band spectrum. In one embodiment, a listening module connected to a remote unit of the DAS is configured to receive electromagnetic signals via an antenna. The listening module is configured to pass received non-supported wireless frequencies different from supported frequencies of the DAS to an output of the listening module. In some examples, one or more filters are configured to also pass the non-supported frequencies, and may be configured to pass one or more supported frequencies to the output as well. In other examples, the antenna is a broadband antenna configured to pass all frequencies to the output. In other examples, the filter(s) are configured to prevent some or all supported frequencies, i.e., frequencies corresponding to the one or more wireless services of the DAS, from being passed to the output.

In this manner, a monitoring module, such as a module connected to head-end equipment (HEE) of the DAS, can use an existing DAS infrastructure to monitor portions of the wireless spectrum outside the supported radio bands of the DAS at one or more remote locations, such as at one or more remote units of the DAS. In addition to avoiding the need to run parallel infrastructure to remotely monitor wireless spectrum throughout an installation, embodiments described herein are also useful in shared spectrum environments and other environments where efficient spectrum utilization is desired. The embodiments disclosed herein can provide increased network visibility, network intelligence, and cost savings when integrated into and existing DAS infrastructure.

One embodiment of the disclosure relates to an apparatus connected to one or more of a plurality of remote units of a DAS for monitoring non-supported wireless spectrum within a coverage area of the DAS. The apparatus includes at least one antenna configured to receive one or more electromagnetic (EM) signals and a listening module connected to the at least one antenna. The listening module comprises at least one input configured to receive the electromagnetic signals from the antenna and at least one output configured to transmit the EM signals over at least one uplink path of the DAS to head-end equipment (HEE). The listening module further includes at least one listening path disposed between the at least one input and the at least one output and configured to pass at least one non-supported radio band different than the at least one supported radio band of the DAS to the at least one output.

An additional embodiment of the disclosure relates to a system for monitoring non-supported wireless spectrum within a coverage area of a DAS having HEE and a plurality of remote units. The system comprises a plurality of antennas configured to receive one or more electromagnetic signals, a listening module connected to at least one of the remote units connected to at least one of the antennas, and a monitoring module connected to the HEE. The listening module includes at least one input configured to receive the electromagnetic signals from the antenna and at least one output configured to transmit the electromagnetic signals over at least one uplink path of the DAS. The listening module further includes at least one listening path disposed between the at least one input and the at least one output and configured to pass a non-supported radio band different than a supported radio band of the DAS to the at least one output. The monitoring module includes at least one input configured to receive the non-supported radio band passed by the filter of the listening module.

An additional embodiment of the disclosure relates to a method of monitoring non-supported wireless spectrum within a coverage area of a DAS. The method comprises receiving, at a plurality of antennas, one or more EM signals and receiving, at a listening module connected to at least one of a plurality of remote units of the DAS, the one or more EM signals from at least one of the antennas. The method further comprises passing the one or more electromagnetic signals in a non-supported radio band different than a supported radio band of the DAS to an output of the listening module.

Additional features and advantages will be set forth in the detailed description which follows. It is to be understood that both the foregoing general description and the following detailed description are merely exemplary, and are intended to provide an overview or framework to understand the nature and character of the claims.

The drawings are incorporated into and constitute a part of this specification. The drawings illustrate one or more embodiment(s), and together with the description serve to explain principles and operation of the various embodiments.

DETAILED DESCRIPTION

Embodiments of the disclosure relate to monitoring non-supported wireless spectrum within coverage areas of a distributed antenna system (DAS). In one embodiment, a listening module connected to a remote unit of the DAS is configured to pass received non-supported wireless frequencies different from supported frequencies of the DAS to an output of the listening module. In the manner, a centrally located monitoring module can use an existing DAS infrastructure to monitor portions of the wireless spectrum outside the supported radio bands of the DAS at one or more remote locations. Various embodiments will be further clarified by the following examples.

Figure 1A:
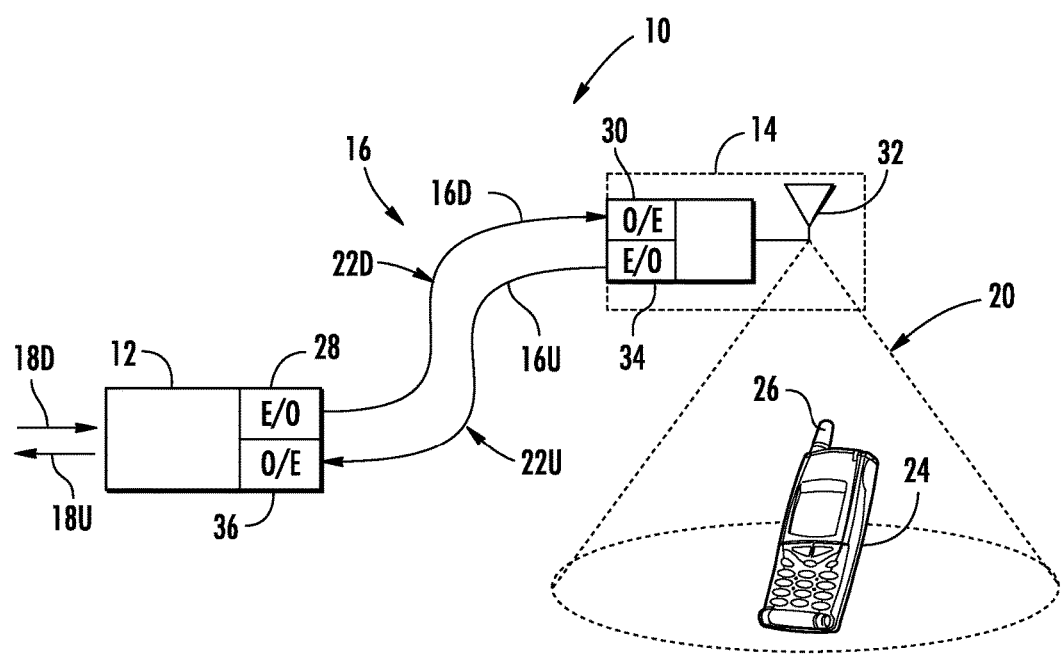
FIGS. 1A and 1B are schematic views of an exemplary optical fiber-based distributed antenna system (DAS) according to the prior art.
Figure 1B:
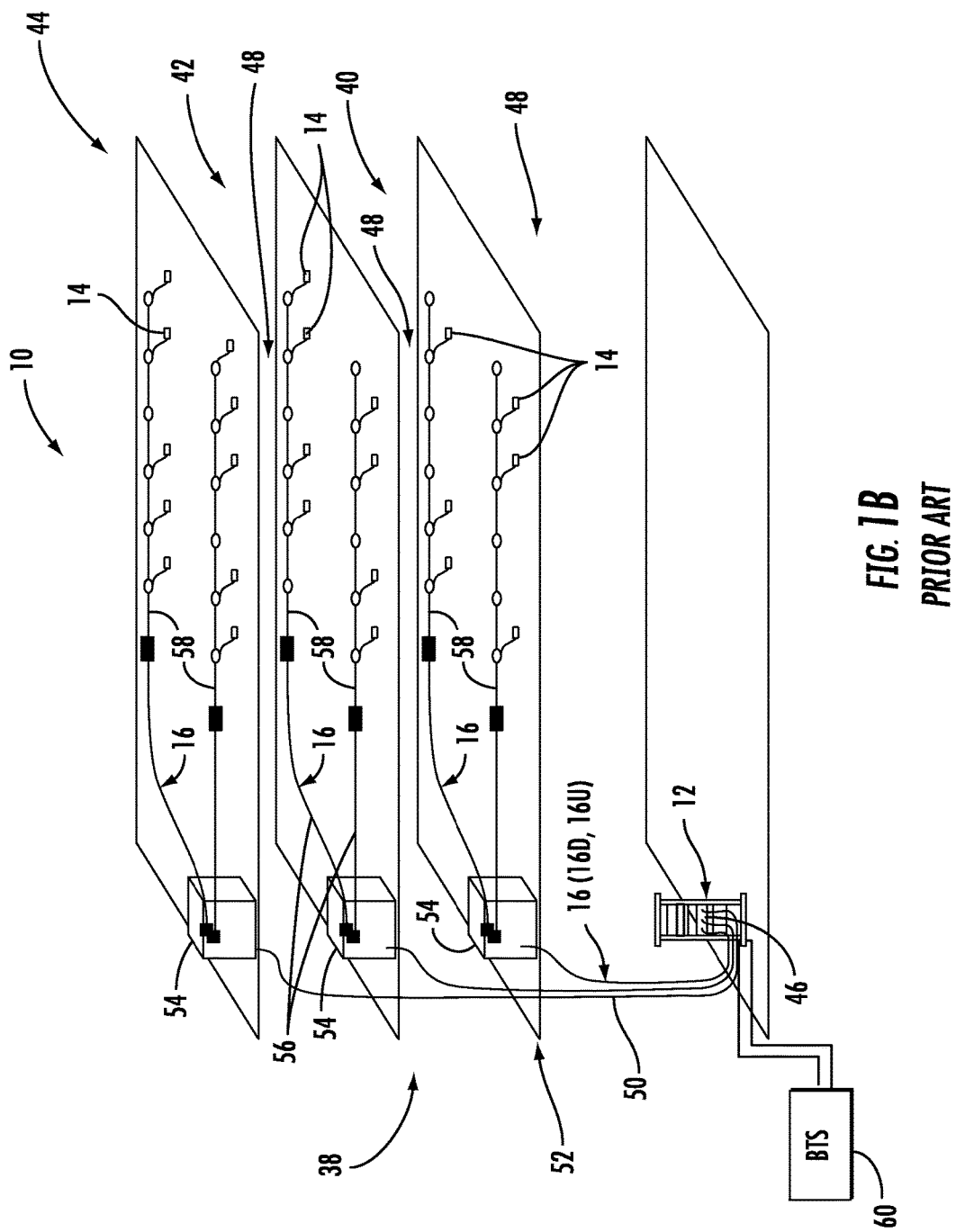
Figure 2:
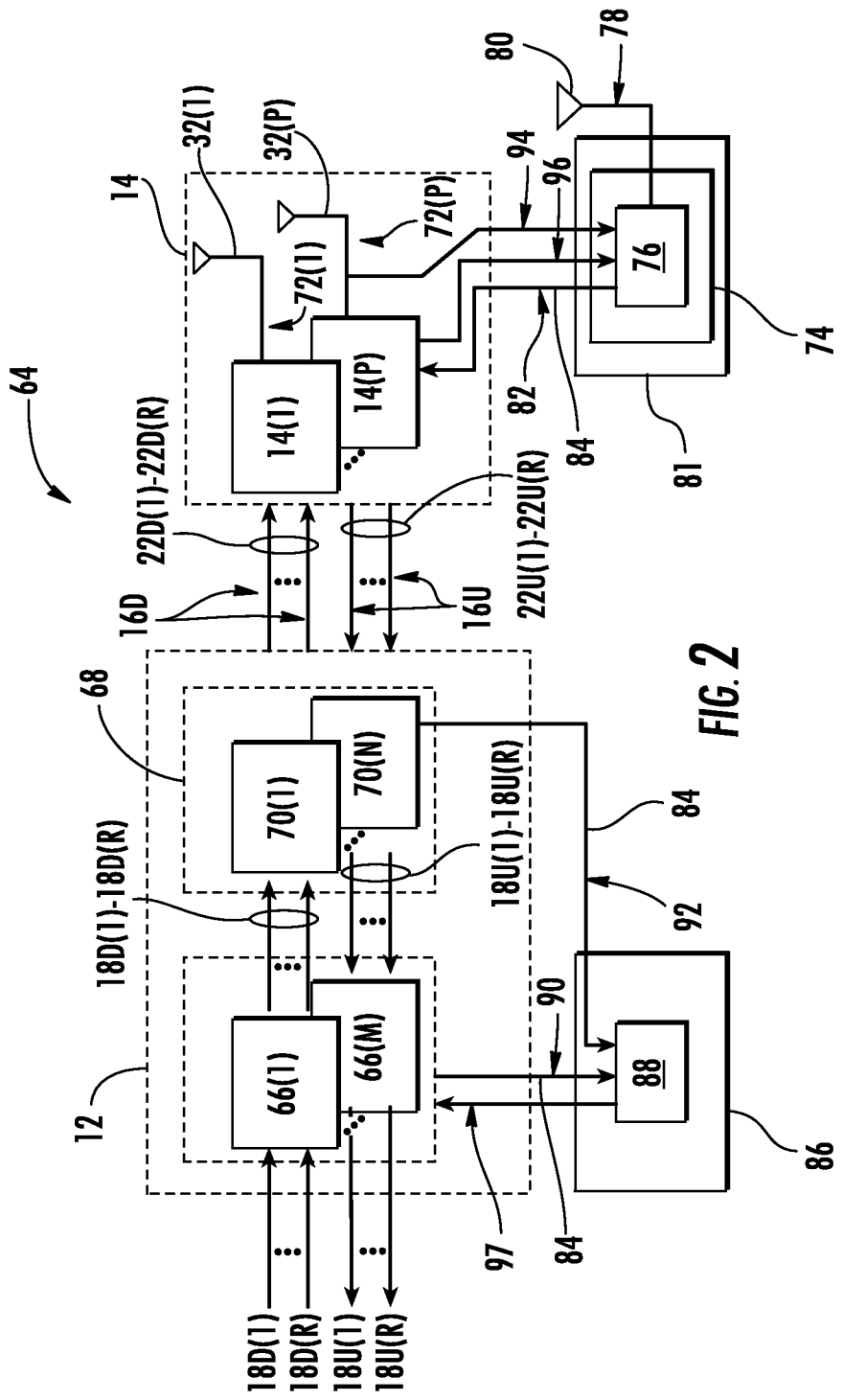
FIG. 2 is a simplified schematic view of a DAS including an associated system for monitoring non-supported wireless spectrum within a coverage area of the DAS, according to an exemplary embodiment.

Before discussing monitoring non-supported wireless spectrum in connection with coverage areas of DASs starting at FIG. 2, FIGS. 1A and 1B are examples of DASs that do not include support for monitoring non-supported wireless spectrum, but that can be configured to provide support for monitoring non-supported wireless spectrum in connection with coverage areas of a DAS, including according to the embodiments described herein.

FIG. 1A is a schematic diagram of an embodiment of a DAS. In this embodiment, the system is an optical fiber-based DAS 10. The optical-fiber based DAS 10 is configured to create one or more antenna coverage areas for establishing communications with wireless client devices located in the radio frequency (RF) range of the antenna coverage areas. The DAS 10 provides RF communications services (e.g., cellular services). In this embodiment, the DAS 10 includes HEE in the form of a HEU 12, one or more remote units 14, and an optical fiber 16 that optically couples the HEU 12 to the remote unit 14. The HEU 12 is configured to receive communications over downlink electrical RF communications signals 18D from a source or sources, such as a network or carrier as examples, and provide such communications to the remote unit 14. The HEU 12 is also configured to return communications received from the remote unit 14, via uplink electrical RF communications signals 18U, back to the source or sources. The optical fiber 16 includes at least one downlink optical fiber 16D to carry signals communicated from the HEU 12 to the remote unit 14 and at least one uplink optical fiber 16U to carry signals communicated from the remote unit 14 back to the HEU 12. One downlink optical fiber 16D and one uplink optical fiber 16U could be provided to support multiple channels, each using wavelength-division multiplexing (WDM), as discussed in U.S. patent application Ser. No. 12/892,424, entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 13/688,448, any of which can be employed in any of the embodiments disclosed herein.

The DAS 10 has an antenna coverage area 20 that can be substantially centered about the remote unit 14. The remote unit 14 is configured to receive downlink optical RF communications signals 22D from the HEU 12 and transmit the content downlink optical RF communications signals 22D wirelessly within the coverage area 20. The HEU 12 is adapted to perform or to facilitate any one of a number of wireless applications, including but not limited to Radio-over-Fiber (RoF), radio frequency identification (RFID), wireless local-area network (WLAN) communication, public safety, cellular, telemetry, and other mobile or fixed services. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF communications signals. In a particular exemplary embodiment, this includes providing WLAN signal distribution as specified in the Institute of Electrical and Electronics Engineers (IEEE) 802.11 standard, i.e., in the frequency range from 2.4 to 2.5 GigaHertz (GHz) and from 5.0 to 6.0 GHz. Any other electrical RF communications signal frequencies are possible.

With continuing reference to FIG. 1A, to communicate the electrical RF communications signals over the downlink optical fiber 16D to the remote unit 14, to in turn be communicated to the client device 24 in the antenna coverage area 20 formed by the remote unit 14, the HEU 12 includes an electrical-to-optical (E/O) converter 28. The E/O converter 28 converts the downlink electrical RF communications signals 18D to downlink optical RF communications signals 22D to be communicated over the downlink optical fiber 16D. The remote unit 14 includes an optical-to-electrical (O/E) converter 30 to convert received downlink optical RF communications signals 22D back to electrical RF communications signals to be communicated wirelessly through an antenna 32 of the remote unit 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF communications signals representing the wireless RF communications to an E/O converter 34 in the remote unit 14. The E/O converter 34 converts the electrical RF communications signals into uplink optical RF communications signals 22U to be communicated over the uplink optical fiber 16U. The E/O converter 34 and the O/E converter 30 constitute a "converter pair," as illustrated in FIG. 1A. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

An O/E converter 36 provided in the HEU 12 converts the uplink optical RF communications signals 22U into uplink electrical RF communications signals, which can then be communicated as uplink electrical RF communications signals 18U back to a network or other source. In an exemplary embodiment, the O/E converter 36 is a photodetector, or a photodetector electrically coupled to a linear amplifier. The E/O converter 28 and the O/E converter 36 also constitute a "converter pair," as illustrated in FIG. 1A. The HEU 12 in this embodiment is only configured to receive supported uplink RF communications signals, i.e., uplink RF communications signals in supported radio bands. As used herein, the terms "supported wireless spectrum," "supported wireless frequency(s)," and/or "supported radio band(s)" refer to a frequency or group of frequencies corresponding to one or more active wireless services of a DAS, for example, a radio band used by a cellular communications provider. The terms "non-supported wireless spectrum," "non-supported wireless frequency(s)," and/or "non-supported radio band(s)" conversely refer to a frequency or group of frequencies that do not correspond to the one or more active wireless services of the DAS.

FIG. 1B provides further exemplary illustration of how an optical fiber-based DAS 10 can be deployed indoors. FIG. 1B is a partially schematic cut-away diagram of a building infrastructure 38 employing an optical fiber-based DAS. The system may be the optical fiber-based DAS 10 of FIG. 1A. The building infrastructure 38 generally represents any type of building in which the optical fiber-based DAS 10 can be deployed. As previously discussed with regard to FIG. 1A, the optical fiber-based DAS 10 incorporates the HEU 12 to provide various types of communication services to coverage areas within the building infrastructure 38, as an example. For example, as discussed in more detail below, the optical fiber-based DAS 10 in this embodiment is configured to receive wireless RF communications signals and convert the RF communications signals into RoF signals to be communicated over the optical fiber 16 to multiple remote units 14. The optical fiber-based DAS 10 in this embodiment can be, for example, an indoor distributed antenna system (IDAS) to provide wireless service inside the building infrastructure 38. These wireless signals can include, but are not limited to, cellular service, wireless services such as RFID tracking, Wireless Fidelity (WiFi), local area network (LAN), WLAN, and combinations thereof, as examples.

However, the DAS 10 of FIGS. 1A and 1B only transmits frequencies corresponding to the uplink optical RF communications signals 22U back to the HEU 12. Thus, the DAS 10 of FIGS. 1A-1B has no spectrum monitoring capability for non-supported wireless frequencies, such as frequencies associated with third party and/or potential add-on services, as well as potential interference sources. In addition, these non-supported wireless frequencies may be present in different amounts throughout the building infrastructure 38. For example, a third party wireless service may have strong coverage at the perimeter of the building infrastructure 38 but may have little or no coverage in the interior of the building infrastructure 38. Likewise, wireless interference may vary at different locations throughout the building infrastructure 38. Thus, it may therefore be advantageous to use existing installed infrastructure of a DAS, such as DAS 10, to monitor non-supported wireless spectrum from a central location, such as a HEU 12 of DAS 10, to more effectively monitor a building infrastructure or other environment.

With continuing reference to FIG. 1B, the building infrastructure 38 in this embodiment includes a first (ground) floor 40, a second floor 42, and a third floor 44. The floors 40, 42, 44 are serviced by the HEU 12 through a main distribution frame 46 to provide antenna coverage areas 48 in the building infrastructure 38. Only the ceilings of the floors 40, 42, 44 are shown in FIG. 1B for simplicity of illustration. In the exemplary embodiment, a main cable 50 has a number of different sections that facilitate the placement of a large number of remote units 14 in the building infrastructure 38. Each remote unit 14 in turn services its own coverage area in the antenna coverage areas 48. The main cable 50 can include, for example, a riser cable 52 that carries all of the downlink and uplink optical fibers 16D, 16U to and from the HEU 12. The riser cable 52 may be routed through an interconnect unit (ICU) 54 to one or more optical fiber cables 56. The ICU 54 may also be configured to provide power to the remote units 14 via an electrical power line provided inside an array cable 58, or tail cable or home-run tether cable as other examples, and distributed with the downlink and uplink optical fibers 16D, 16U to the remote units 14. The main cable 50 can include one or more multi-cable (MC) connectors adapted to connect select downlink and uplink optical fibers 16D, 16U, along with an electrical power line, to a number of optical fiber cables 56.

The main cable 50 enables the multiple optical fiber cables 56 to be distributed throughout the building infrastructure 38 (e.g., fixed to the ceilings or other support surfaces of each floor 40, 42, 44) to provide the antenna coverage areas 48 for the first, second and third floors 40, 42 and 44. In an exemplary embodiment, the HEU 12 is located within the building infrastructure 38 (e.g., in a closet or control room), while in another exemplary embodiment, the HEU 12 may be located outside of the building infrastructure 38 at a remote location. A base transceiver station (BTS) 60, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell. Alternatively, radio input could be provided by a repeater or picocell as other examples.

The optical fiber-based DAS 10 in FIGS. 1A and 1B described above provides point-to-point communications between the HEU 12 and the remote units 14. Each remote unit 14 communicates with the HEU 12 over a distinct downlink and uplink optical fiber pair 16D/16U to provide the point-to-point communications. Whenever a remote unit 14 is installed in the optical fiber-based DAS 10, the remote unit 14 is connected to a distinct downlink and uplink optical fiber pair connected to the HEU 12. The downlink and uplink optical fibers 16D/16U may be provided in the optical fiber 16. Multiple downlink and uplink optical fiber pairs 16D/16U can be provided in a fiber optic cable to service multiple remote units 14 from a common fiber optic cable. For example, with reference to FIG. 1B, remote units 14 installed on a given floor 40, 42, or 44 may be serviced from the same optical fiber 16, which may have multiple nodes where distinct downlink and uplink optical fiber pairs 16D/16U are connected to a given remote unit 14.

It may be desirable to provide an optical fiber-based DAS that can support a wide variety of radio sources. For example, it may be desired to provide an optical fiber-based DAS that can support various radio types and sources, including but not limited to Long Term Evolution (LTE), US Cellular (CELL), Global System for Mobile Communications (GSM), Code Division Multiple Access (CDMA), Time Division Multiple Access (TDMA), Advanced Wireless Services (AWS), iDEN (e.g., 800 MegaHertz (MHz), 900 MHz, and 1.5 GHz), etc. These radios sources can range from 400 MHz to 2700 MHz as an example. To support a radio source, the HEU must contain lasers that are capable of modulating the radio signal into optical RF communications signals at the frequency of the radio signal for transmission over optical fiber. Likewise, lasers must be provided to convert the optical RF communications signals back into electrical RF communications signals at the frequencies of the radio band supported. It is costly to provide different conversion lasers for all possible radio sources that may be desired to be supported by an optical fiber-based DAS.

As noted above, the DAS 10 of FIGS. 1A and 1B has no spectrum monitoring capability for non-supported wireless frequencies. Thus, it may be advantageous to use existing installed infrastructure of a DAS, such as DAS 10, to monitor non-supported wireless spectrum from a central location, such as a HEU 12 of DAS 10, to more effectively monitor a building infrastructure 38 or other environment.

FIG. 2 is a schematic diagram of such a DAS 64 that can support monitoring non-supported wireless spectrum within a coverage area of the DAS 64. The DAS 64 includes a HEU 12, a plurality of remote units 14, a monitoring unit 86 connected to HEU 12, at least one listening unit 74 connected to one or more remote units 14. Each listening unit 74 includes a listening module 76 having a listening path that may include one or more filters (described in detail below with respect to FIG. 3) configured to pass received non-supported wireless frequencies different from supported frequencies of the DAS 64 to an output of the listening module. The non-supported frequencies are then transmitted to the HEU 12 via the DAS 64 infrastructure and routed to the monitoring unit 86. The monitoring unit 86 includes a monitoring module 88 that receives and processes the non-supported wireless frequencies via one or more inputs, thereby monitoring portions of the wireless spectrum outside the supported radio bands of the DAS 64 at one or more remote locations, such as at one or more remote units 14 of the DAS 64.

The DAS 64 will now be described in detail to illustrate how the monitoring unit 86 and listening unit(s) 74 are able to use the infrastructure of the DAS 64 to monitor non-supported wireless frequencies. In this embodiment, the DAS 64 is an optical fiber-based DAS comprised of three main components. One or more radio interfaces provided in the form of radio interface modules (RIMs) 66(1)-66(M) in this embodiment are provided in HEU 12 to receive and process downlink electrical RF communications signals 18D(1)-18D(R) prior to optical conversion into downlink optical RF communications signals 22D(1)-22D(R). The processing of the downlink electrical RF communications signals 18D(1)-18D(R) can include any of the processes previously described above in the HEU 12 in FIG. 2. The notations "1-R" and "1-M" indicate that any number of the referenced component, 1-R and 1-M, respectively, may be provided. As will be described in more detail below, the HEU 12 in this embodiment is configured to accept a plurality of RIMs 66(1)-66(M) as modular components that can be easily installed and removed or replaced in the HEU 12. In one embodiment, the HEU 12 is configured to support up to four (4) RIMs 66(1)-66(M).

Each RIM 66(1)-66(M) can be designed to support a particular type of radio source or range of radio sources (i.e., frequencies) to provide flexibility in configuring the HEU 12 and optical fiber-based DAS 64 to support the desired radio sources. For example, one RIM 66 may be configured to support the Personal Communication Services (PCS) radio band. Another RIM 66 may be configured to support the Long Term Evolution (LTE) 700 MHz radio band. In this example, by inclusion of these RIMs 66, the HEU 12 would be configured to support and distribute RF communications signals on both PCS and LTE 700 MHz radio bands. RIMs 66 may be provided in the HEU 12 that support any other radio bands and technologies desired, including but not limited to PCS, LTE, CELL, GSM, CDMA, CDMA2000, TDMA, AWS, iDEN (e.g., 800 MHz, 900 MHz, and 1.5 GHz), Enhanced Data GSM Environment, (EDGE), Evolution-Data Optimized (EV-DO), 1xRTT (i.e., CDMA2000 1X (IS-2000)), High Speed Packet Access (HSPA), 3GGP1, 3GGP2, and Cellular Digital Packet Data (CDPD). More specific examples include, but are not limited to, radio bands between 400-2700 MHz including but not limited to 700 MHz (LTE), 698-716 MHz, 728-757 MHz, 776-787 MHz, 806-824 MHz, 824-849 MHz (US Cellular), 851-869 MHz, 869-894 MHz (US Cellular), 880-915 MHz (EU R), 925-960 MHz (TTE), 1930-1990 MHz (US PCS), 2110-2155 MHz (US AWS), 925-960 MHz (GSM 900), 1710-1755 MHz, 1850-1915 MHz, 1805-1880 MHz (GSM 1800), 1920-1995 MHz, and 2110-2170 MHz (GSM 2100).

The downlink electrical RF communications signals 18D(1)-18D(R) are provided to an optical interface unit (OIU) 68 having a plurality of optical interfaces provided in the form of optical interface modules (OIMs) 70(1)-70(N) in this embodiment to convert the downlink electrical RF communications signals 18D(1)-18D(N) into downlink optical RF communications signals 22D(1)-22D(R). The notation "1-N" indicates that any number of the referenced component 1-N may be provided. One downlink optical fiber 16D and one uplink optical fiber 16U could be provided to support multiple channels each using WDM or FDM.

In this embodiment, the OIMs 70(1)-70(N) are provided in a common housing provided for the HEU 12 with the RIMs 66(1)-66(M). Alternatively, the OIMs 70(1)-70(N) could be located in separately from the RIMs 66(1)-66(M). The OIMs 70 may be configured to provide one or more optical interface components (OICs) that contain O/E and E/O converters, as will be described in more detail below. The OIMs 70 support the radio bands that can be provided by the RIMs 66, including the examples previously described above. Thus, in this embodiment, the OIMs 70 may support a radio band range from 400 MHz to 2700 MHz, as an example, so providing different types or models of OIMs 70 for narrower radio bands to support possibilities for different radio band supported RIMs 66 provided in the HEU 12 is not required. Further, as an example, the OIMs 70 may be optimized for sub-bands within the 400 MHz to 2700 MHz frequency range, such as 400-700 MHz, 700 MHz-1 GHz, -1 GHz-1.6 GHz, and 1.6 GHz-2.7 GHz, as examples.

The OIMs 70(1)-70(N) each include E/O converters to convert the downlink electrical RF communications signals 18D(1)-18D(R) to downlink optical RF communications signals 22D(1)-22D(R). The downlink optical RF communications signals 22D(1)-22D(R) are communicated over downlink optical fiber(s) 16D to a plurality of remote units 14(1)-14(P). The notation "1-P" indicates that any number of the referenced component 1-P may be provided. O-E converters provided in the remote units 14(1)-14(P) convert the downlink optical RF communications signals 22D(1)-22D(R) back into downlink electrical RF communications signals 18D(1)-18D(R), which are provided over links 72(1)-72(P) coupled to antennas 32(1)-32(P) in the remote units 14(1)-14(P) to client devices in the reception range of the antennas 32(1)-32(P).

In this embodiment, the listening unit 74 includes a listening module 76 having a link 78 to a dedicated antenna 80. The listening unit 74 in this example is part of a remote expansion unit (RXU) 81 that is a separate unit from the remote unit 14. In other embodiments, the listening unit 74 may be a separate unit from both the remote unit 14 and RXU 81. In another example, the listening module 76 may be an integrated component or a plug-in component of the remote unit 14. The antenna 80 may be a broadband or a narrowband antenna and is capable of receiving one or more non-supported wireless frequencies. The listening unit 74 is connected to the remote unit(s) 14 by a link 82 that transmits a monitor signal 84 containing the non-supported wireless frequencies to the remote unit(s) 14 where they can be combined with one or more of the uplink optical RF communications signals 22U for transmission back to the HEU 12. The monitoring module 88 of the monitoring unit 86 can then receive the monitor signal 84 from a link 90 from the RIM(s) 66 and/or a link 92 from the OIU 68. The monitoring unit 86 in this example is a separate unit from the HEU 12, and may be part of another device or component connected to the HEU 12. In another example, the monitoring module 88 may be an integrated component or a plug-in component of the HEU 12. In this embodiment, the link 90 to the RIM(s) 66 is configured to transmit narrowband signals corresponding to wireless frequencies near the supported radio band of the RIM(s) 66. Conversely, the link 92 to the OIU 68 in this embodiment is configured to transmit broadband signals corresponding to a large range of non-supported wireless frequencies and can also be used for narrow band monitoring, similar to link 90, as well. It should be understood that alternative methods of routing, such employing an RF matrix for routing signals between multiple links to a single monitoring unit, are contemplated as well.

In this embodiment, the listening module 76 can also be connected via a link 94 to one or more of the antennas 32(1)-32(P) connected to the remote units 14(1)-14(P). As will be discussed in detail below with respect to FIG. 3, the listening module can include different modes that employ one or more of the different antennas 32, 80. These and other functions can be controlled via a control link 96. In this embodiment, a control signal, received at the HEU 12 via another control link 97, is embedded within one or more downlink optical RF communications signals 22D and delivered to the listening module 76 from the remote unit(s) 14 via the control link 96. In other embodiments, a separate control signal may be employed.

In some embodiments, the above described components may have a wide range of capabilities. For example, the listening module 76 may be capable of providing spectrum monitoring over a wide range of RF frequencies, e.g., 10 MHz-6 GHz. In another example, the listening module 76 and/or monitoring module 88 may be self-optimized and/or self-configurable, thereby permitting advanced integration and interoperability with small cells and other radio sources that may be connected to a DAS.

Figure 3:
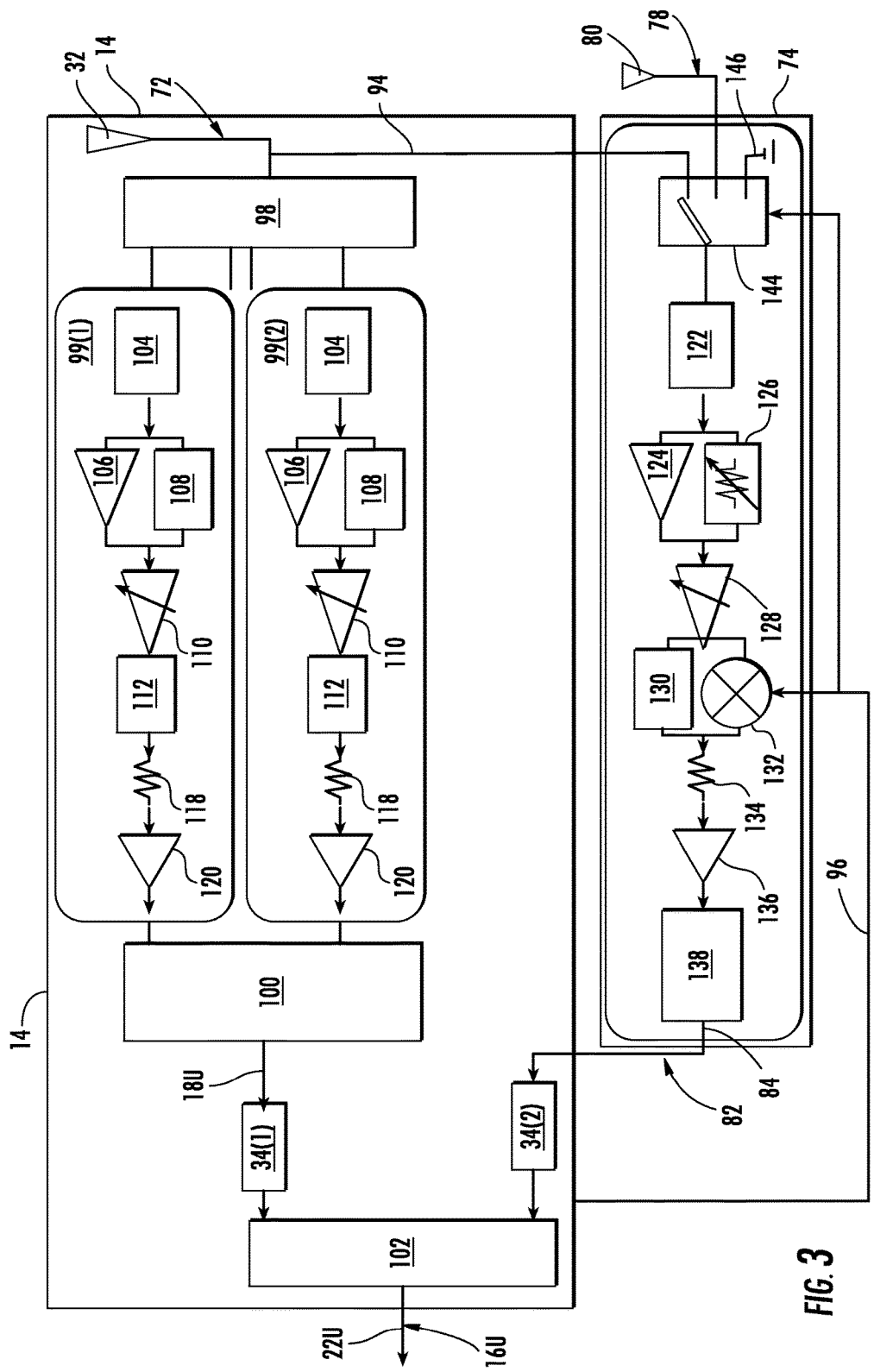
FIG. 3 is a detailed schematic view of a listening unit connected to a remote unit of a DAS having a listening module for monitoring non-supported wireless spectrum and an associated remote unit of the DAS of FIG. 2, according to an exemplary embodiment.

To illustrate the functionality and operation of the listening module 76, the internal components of the listening unit 74 and an exemplary remote unit 14 will be described. In this regard, FIG. 3 illustrates a detailed schematic view of the listening unit 74 and associated remote unit 14 of the DAS 64 of FIG. 2. In this embodiment, the remote unit 14 includes a broadband antenna 32 connected to a multiplexer/demultiplexer 98 which sends the received signal to one or more uplink frequency band paths 99. In this embodiment, the remote unit 14 includes two uplink frequency band paths 99(1)-99(2), but more or fewer uplink frequency band paths 99 are possible as well. As will be described in greater detail below, each uplink frequency band path 99 filters and passes a predetermined supported upload frequency band to a frequency mux/combiner 100, which combines the outputs of the uplink frequency band paths 99 into a combined signal and outputs one or more uplink electrical RF communications signals 18U. E/O converter 34(1) converts the uplink electrical RF communications signal 18U to an optical signal for transmission to the HEU 12 (not shown).

Meanwhile, the listening module 76 of the listening unit 74 forms a spectrum monitoring path for monitoring non-supported wireless frequencies. As discussed above, the listening module 76 receives EM radiation via the antenna 80 (or, alternatively, via a broadband antenna 32) and outputs the monitor signal 84 into an E/O converter 34(2), which converts the monitor signal 84 into an optical signal. The outputs of both E/O converters 34(1) and 34(2) are received by a wave division multiplexer 102, and are multiplexed into one or more uplink optical RF communications signals 22U.

In this manner, the monitor signal 84 may be carried over the existing infrastructure of a DAS, such as DAS 64, and delivered to a centrally located monitoring module, such as monitoring module 88. One advantage of this arrangement is that a number of third party and other non-supported wireless components, such as small-cell or femtocell components (not shown), can be installed in a central location, such as in proximity to HEU 12. Some of these components employ a listening mode to gather information about the transmission environment as part of their initialization and configuration process. Therefore, this arrangement permits these components to receive accurate information about the transmission environment, i.e., the remote unit 14 locations, while remaining physically located proximate to the HEU 12. As discussed above, in addition to avoiding the need to run parallel infrastructure to remotely monitor wireless spectrum throughout an installation, embodiments described herein are also useful in shared spectrum environments and other environments where efficient spectrum utilization is desired.

The internal components of the uplink frequency band paths 99(1) and 99(2) of the remote unit 14 and the spectrum monitoring path of the listening module 76 are analogous to each other in many respects. In this example, each uplink frequency band path 99 includes a limiter/detector 104 that receives a signal output from multiplexer 98. A parallel low noise amplifier 106 and filter 108 next pass the signal through a variable gain amplifier 110 and into filter 112. Each filter 112 is tuned to pass a specific supported frequency band through the variable attenuator 118 to gain amplifier 120 and outputs the signal to frequency mux/combiner 100, thereby preventing non-supported frequencies from being passed to the output of the uplink frequency band path 99.

In a similar arrangement, the spectrum monitoring path, also referred to as a listening path, of the listening module 76 includes a limiter/detector 122 that receives a signal from one of antenna 80 or antenna 32. In this example, a selectable low noise amplifier 124 and optional attenuator 126 next pass the signal through a variable gain amplifier 128 and into a selectable filter 130 and/or mixer 132. The mixer 132 permits selective tuning of the passed frequencies, while the filter 130 permits passing a fixed frequency or frequencies. The filter 130 and mixer 132 can also be bypassed entirely, thereby passing the entire range of frequencies received by antenna 80 and/or antenna 32. The passed wireless frequencies are next passed through the variable attenuator 134 to gain amplifier 136 and analog/digital converter 138, finally outputting the signal to E/O converter 34(2), likewise preventing non-tuned wireless frequencies, which may include both supported and non-supported radio bands, from being passed to the output of the uplink frequency band path. In an alternative embodiment, the mixer 132 and other components permitting selectable tuning can be omitted, such that the spectrum monitoring path is tuned to a fixed frequency band. It should also be understood that the wave division multiplexer 102 and analog/digital converter 138 are also optional and are not required for a DAS that does not include digital signal distribution. In an alternative, analog-only embodiment, for example, the output signal from gain amplifier 136 can be combined directly with the output of mux/combiner 100 and output to a single E/O converter 34(1).

In this example, the listening module has a number of different antenna modes. In a disabled mode, an antenna switch 144 is set to fifty ohm (50Ω) termination (or terminated) mode 146, thereby turning off the listening module 76. In first broadband listening mode, the switch 144 connects the listening module 76 to antenna 80, thereby permitting reception of all frequencies capable of being received by antenna 80. In a second listening mode, the switch 144 connects the listening module 76 to one or more of the broadband antennas 32 of the remote unit(s) 14, thereby permitting reception of all frequencies capable of being received by broadband antenna(s) 32, for example, by bypassing the filter 130 and/or mixer 132, or by omitting the filter 130 and mixer 132 entirely.

These components allow for configurable spectrum bandwidth support and signal level sensitivity. For example, the listening module 76 of FIG. 3 may be configured for broad band spectrum monitoring (e.g., 10 MHz-6 GHz, etc.), narrow band spectrum monitoring (e.g., 450 MHz, 700 MHz, 850 MHz, 1900 MHz, etc.), or a combination of the two. Likewise, the listening module of FIG. 4 may also be configured to operate in a high level sensitivity mode employing amplification to optimize for monitoring weak signals, a low level sensitivity mode employing attenuation to optimize for monitoring strong signals, or a mixed mode employing a combination of the two. The various functions of the listening module may be controlled manually, automatically or remotely, for example via one or more control links 96 connected to the remote units 14. In the same manner, referring back to FIG. 2, the RIM(s) 66 and/or OIU 68 can also include complementary components (not shown) for demuxing, demultiplexing, or otherwise extracting the monitor signal 84 from the uplink optical RF communications signal 22U.

Figure 4:
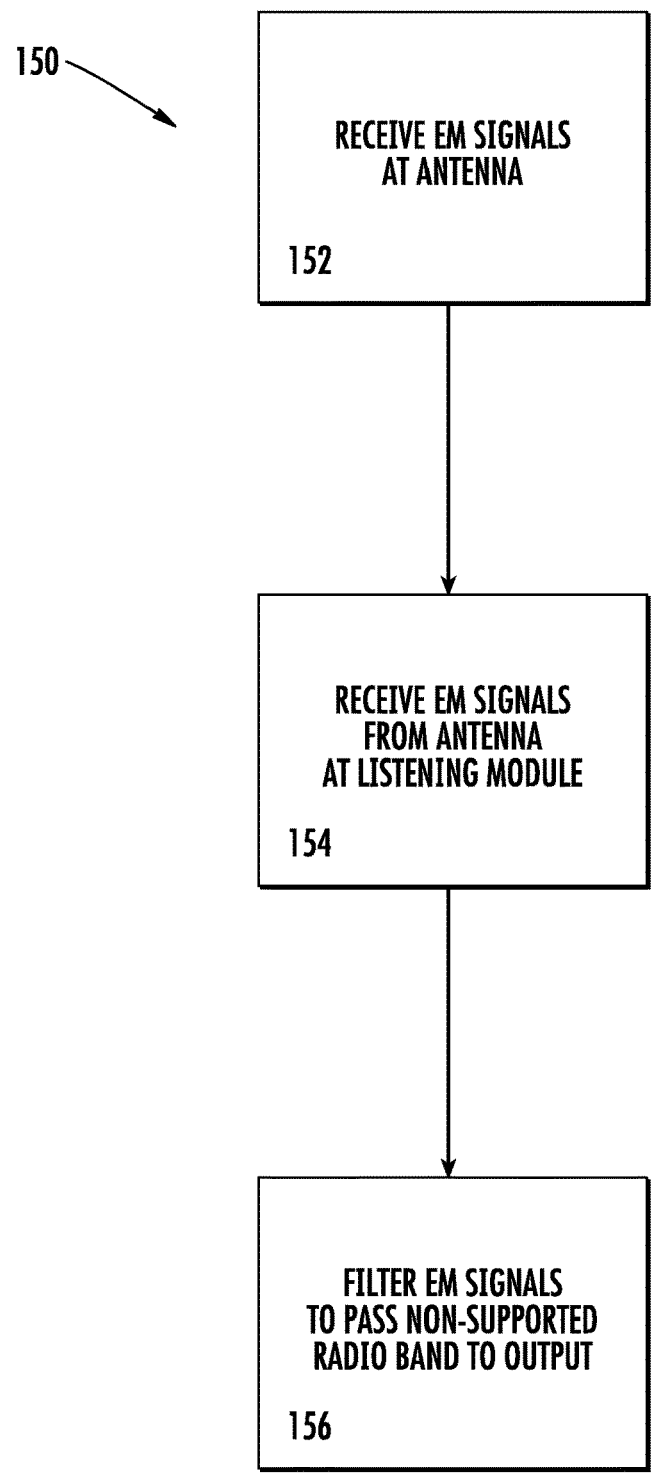
FIG. 4 is a flowchart diagram of an exemplary method of operation of the listening module connected to a remote unit of the DAS for monitoring non-supported wireless spectrum of FIG. 2, according to an exemplary embodiment.

An exemplary method of operation of the listening module 76 of FIGS. 2 and 3 are now described. In this regard, FIG. 4 is a flowchart of an exemplary method 150 of monitoring non-supported wireless spectrum within a coverage area of a DAS. The method 150 includes receiving, at an antenna, one or more EM signals (block 152). For example, receiving EM signals could be performed by the antenna 80 of FIG. 3. The method 150 further includes receiving, at a listening module, such as listening module 76, the one or more EM signals from the antenna (block 154). The method 150 further comprises filtering the one or more EM signals (block 156) to pass a non-supported radio band different than a supported radio band of the DAS to an output of the listening module. In one example, the filtering could be performed by filter 130 of FIG. 3.

Figure 5:
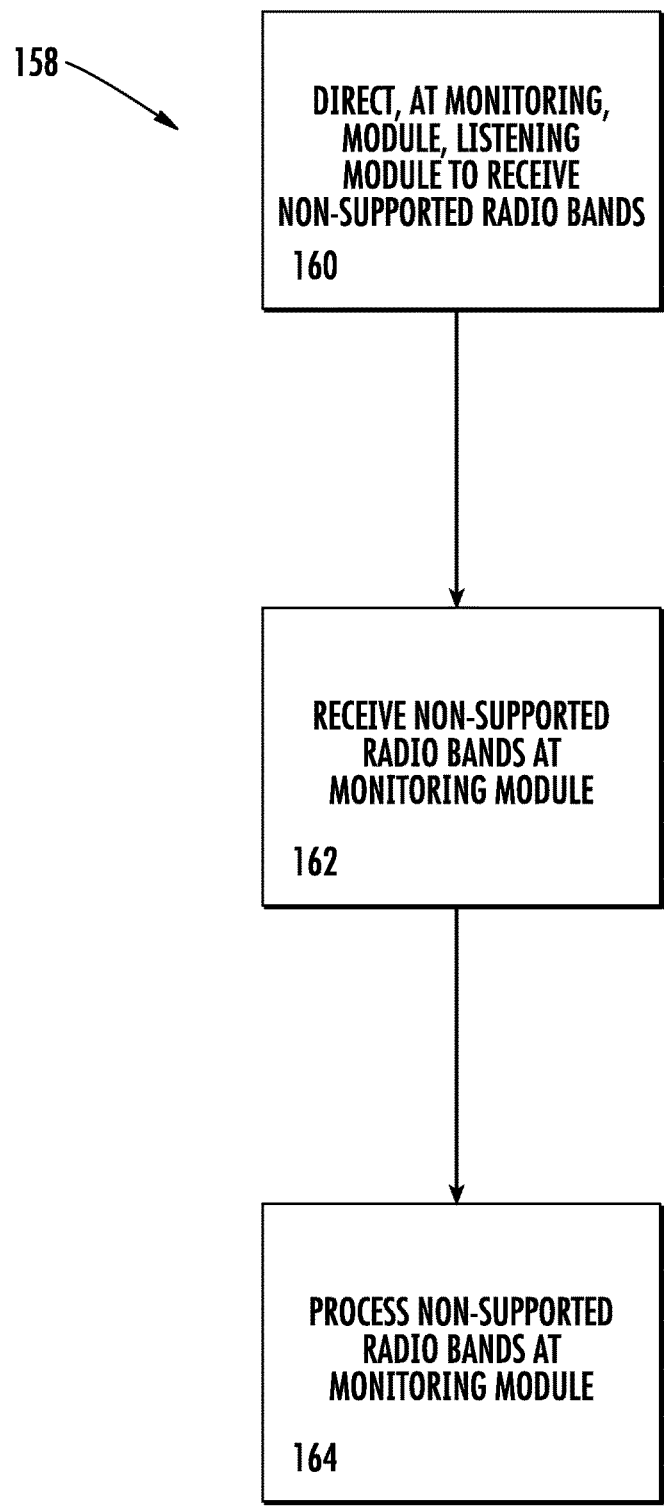
FIG. 5 is a flowchart diagram of a method for operating a monitoring module of the DAS of FIG. 2, according to an alternative embodiment.

FIG. 5 is a flowchart of an exemplary method 158 of operating a monitoring module according to another embodiment. The method 158 includes directing, at a monitoring module, such as monitoring module 88 of FIG. 2, a listening module, such as the listening module 76, to receive EM signals corresponding to a non-supported radio band different than a supported radio band of the DAS (block 160). The method 158 further includes receiving the EM signals corresponding to the non-supported radio bands at the monitoring module via the infrastructure of a DAS, such as DAS 64 (block 162). In one example, the infrastructure of the DAS that delivers the EM signals may be one or more OIM 70 or RIM 66 of the DAS 64 of FIG. 2. The method 158 further includes processing, interpreting or otherwise utilizing the EM signals corresponding to the non-supported radio bands by the monitoring module (block 164).

Figure 6:
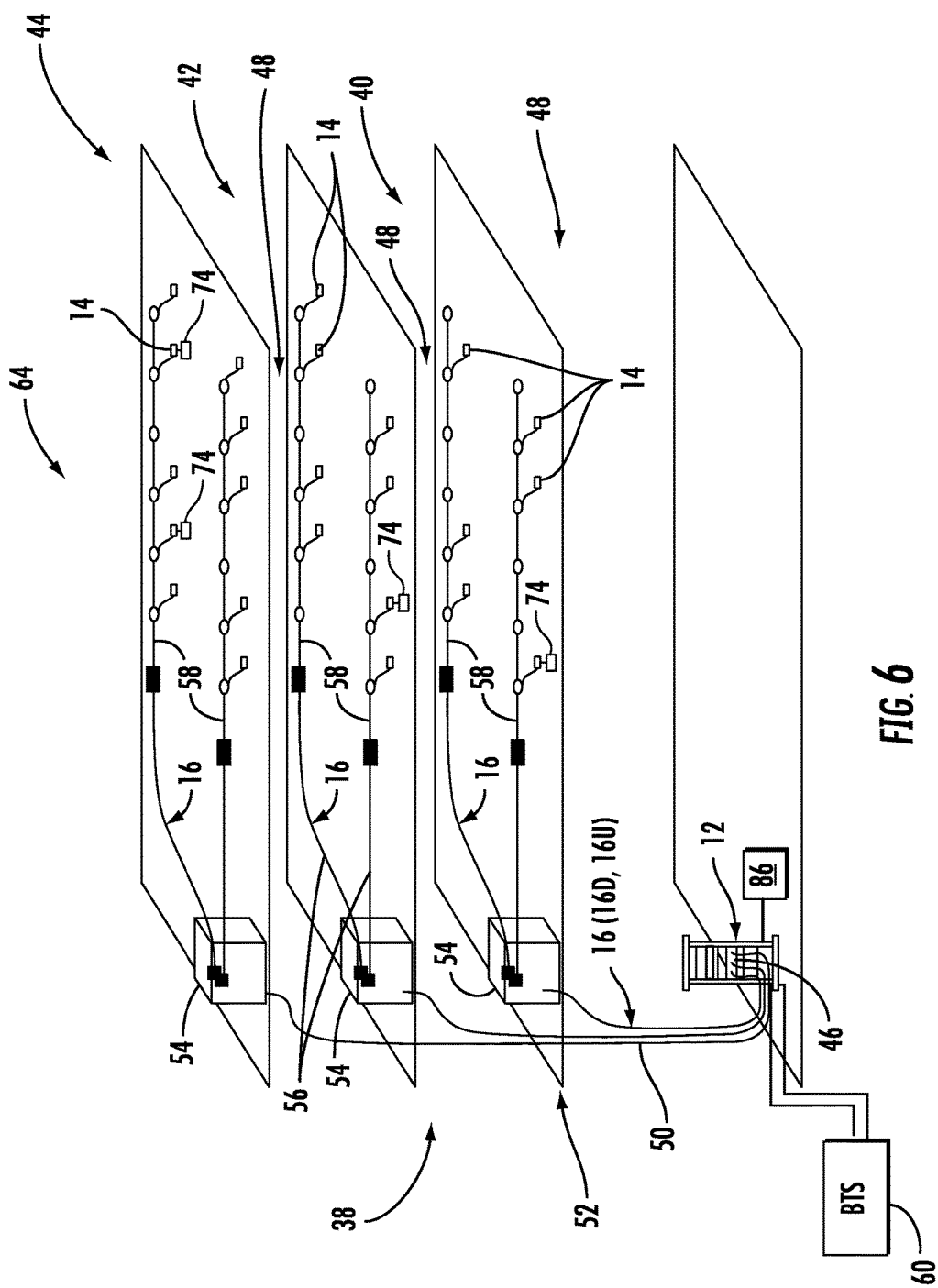
FIG. 6 is a general schematic view of an exemplary DAS building installation including the system for monitoring non-supported wireless spectrum of FIG. 2, according to an exemplary embodiment.

In this manner, the above described methods can monitor non-supported wireless spectrum throughout an installation, such as the building infrastructure 38 of FIG. 1B, using the installed DAS infrastructure. In this regard, FIG. 6 illustrates the building infrastructure 38 of FIG. 1B having the DAS 64 and additional associated spectrum monitoring components of FIGS. 2 and 3. In this example, monitoring unit 86 is connected to HEU 12, and a number of remote units 14 on different floors and in different locations are connected to respective listening units 74. In this manner, the monitoring unit 86 is able to monitor non-supported wireless spectrum in a variety of different locations within a building infrastructure 38 using the existing infrastructure of the DAS 64.

Figure 7:
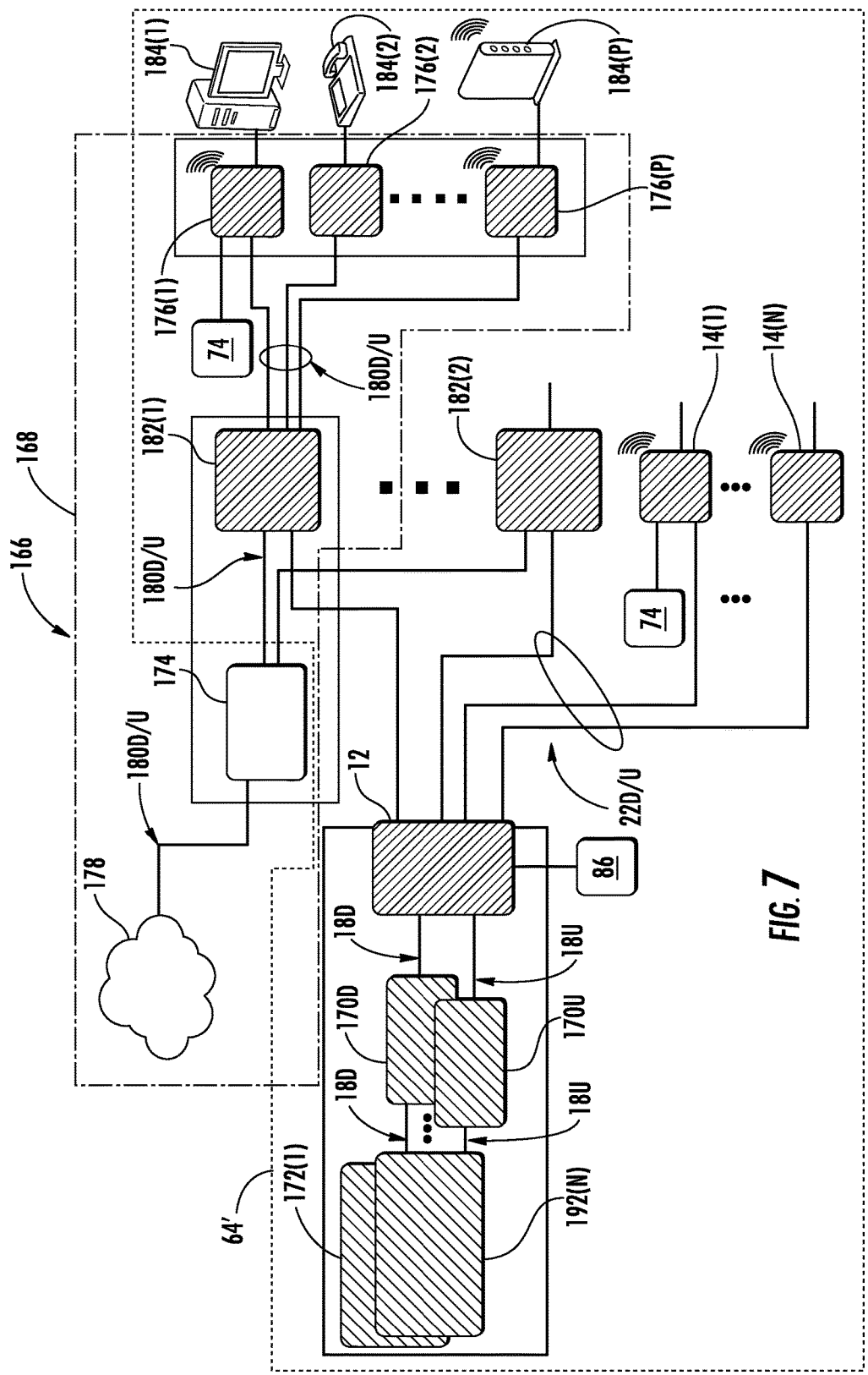
FIG. 7 is a general schematic view of an exemplary DAS configured to distribute digital and/or analog signals within a coverage area of the DAS, and which also includes an associated system for monitoring non-supported wireless spectrum in coverage areas of the DAS according to an exemplary embodiment.

As discussed above, the embodiments of FIGS. 2, 3, and 6 relate to spectrum monitoring using an RF-based DAS 64. However, spectrum monitoring in accordance with the present disclosure may be employed using DASs that include digital signal distribution as well. In this regard, FIG. 7 is a schematic diagram of an alternative DAS 166 that includes the a DAS 64' similar to DAS 64 in FIG. 3 in combination with a wireless local access network (WLAN) system 168 for providing digital data services. In this regard, the DAS 166 includes the HEU 12 previously described above with regard to FIG. 2.

The HEU 12 is configured to receive the downlink electrical RF communications signals 18D through downlink interfaces 170 from one or more base stations 172(1)-172(N), wherein N can be any number. The HEU 12 can be configured receive RF communications services from multiple base stations 172(1)-172(N) to support multiple RF radio bands in the DAS 166. The HEU 12 is also configured to provide the downlink optical RF communication signals 22D to the remote units 14(1)-14(N) and receive the uplink optical RF communications signals 22U from remote units 14(1)-14(N) over a communications medium. M number of remote units 14 signifies that any number, M number, of remote units 14 could be communicatively coupled to the HEU 12, as desired. Similar to the embodiments of FIGS. 2, 3, and 6, the DAS 166 also includes additional associated spectrum monitoring components described in detail with respect to FIGS. 2 and 3. In this example, monitoring unit 86 is connected to HEU 12, and a number of remote units 14 are connected to respective listening units 74. In this manner, the monitoring unit 86 is able to monitor non-supported wireless spectrum in a variety of different locations using the existing infrastructure of the DAS 64.

With continuing reference to FIG. 7, a digital data switch 174 may also be provided in the WLAN system 168. The digital data switch 174 may be provided in the WLAN system 176 for providing digital data signals, such as for WLAN services for example, to remote units 176(1)-176(P) configured to support digital data services, wherein P signifies that any number of the remote units 176 may be provided and supported by the WLAN system 168. Similar to the remote units 14 above, a number of remote units 176 in this embodiment are also connected to respective listening units 74. In this manner, the monitoring unit 86 is able to monitor non-supported wireless spectrum at the locations of digitally based remote units 176 as well.

The digital data switch 174 may be coupled to a network 178, such as the Internet. Downlink digital data signals 180D from the network 178 can be provided to the digital data switch 174. The downlink digital data signals 180D can then be provided to the remote units 176(1)-176(P) through slave central units 182(1)-182(Q), wherein Q can be any number desired. The digital data switch 174 can also receive uplink digital data signals 180U from the remote units 176(1)-176(P) to be provided back to the network 178. The slave central units 182(1)-182(Q) also receive the downlink optical RF communications signals 22D and provide uplink optical RF communications signals 22U from the remote units 176(1)-176(P) to the HEU 12 in this embodiment. In this regard, the remote units 176(1)-176(P), by being communicatively coupled to a slave central unit 182(1) that supports both the RF communications services and the digital data services, is included in both the distributed antenna system 64' and the WLAN system 168 to support RF communication services and digital data services, respectively, with client devices 184(1)-184(P). For example, such remote unit 176 may be configured to communicate wirelessly with the WLAN user equipment (e.g., a laptop) and Wide Area Wireless service user equipment (e.g., a cellular phone).

A number of different digital data devices may also be included, such as WLAN access points, femtocells, gateways, baseband units (BBU), remote radio heads (RRH), and wired and wireless servers. Digital data services may also be provided via connected desktop computers, hubs, switches, and other devices. Any of these digital data devices may include hardware and/or software for remotely monitoring non-supported spectrum via the DAS.

Figure 8:
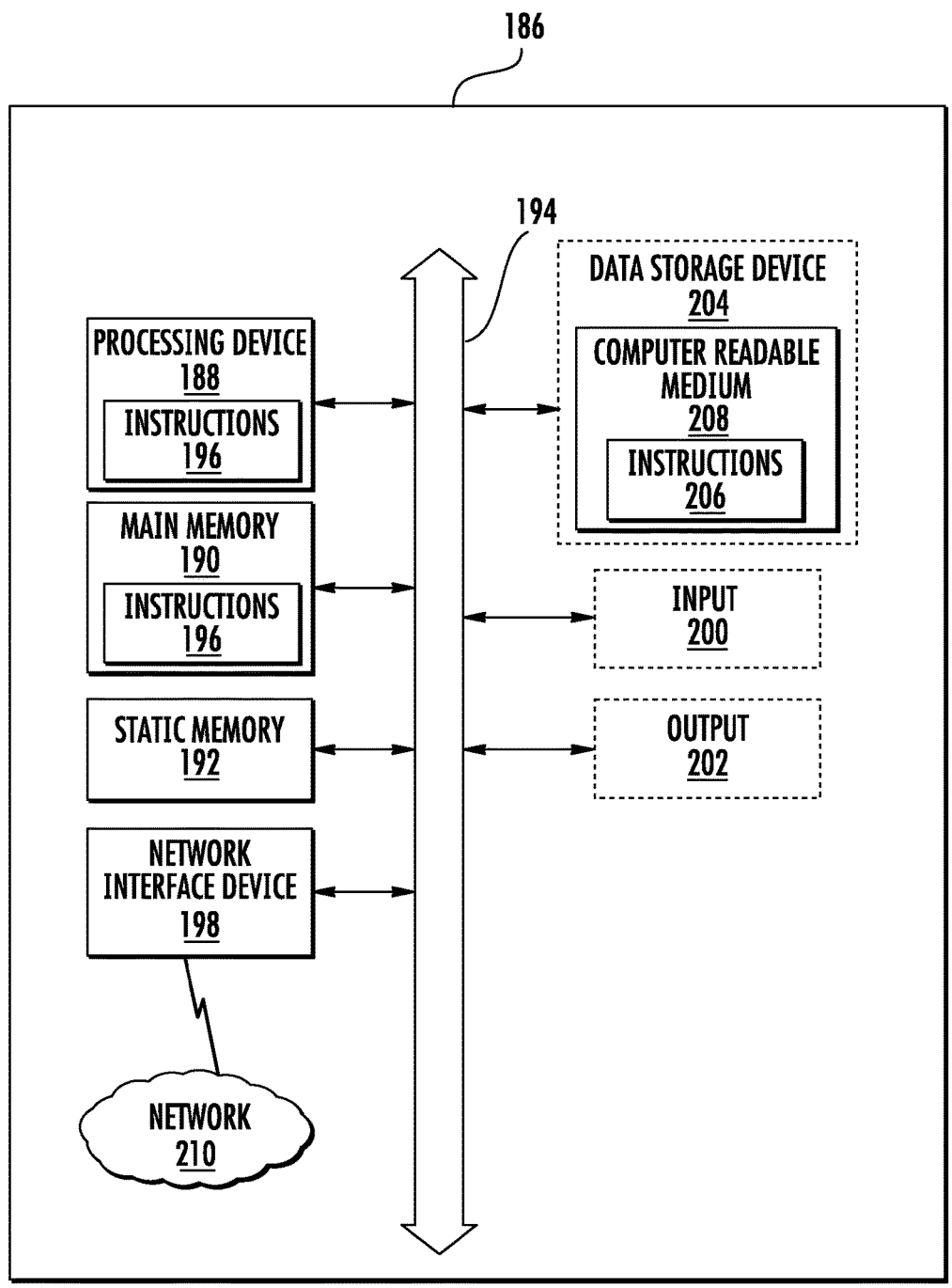
FIG. 8 is a schematic diagram view of a generalized representation of an exemplary computer system that can be included in or interface with any of the systems for monitoring non-supported wireless spectrum within coverage areas of a DAS.

In addition, any of the DASs and other components disclosed herein, including the monitoring unit 86, monitoring module 88, listening unit 74, and/or listening module 76 of FIGS. 2, 3, 6 and 7, can include a computer system. In this regard, FIG. 8 is a schematic diagram representation of additional detail regarding an exemplary form of an exemplary computer system 186 that is adapted to execute instructions. In this regard, the computer system 186 includes a set of instructions for causing the DAS component(s) to provide its designed functionality. The DAS component(s) may be connected (e.g., networked) to other machines in a LAN, an intranet, an extranet, or the Internet. The DAS component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The DAS component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 184 in this embodiment includes a processing device or processor 188, a main memory 190 (e.g., read-only memory (ROM), flash memory, dynamic random access memory (DRAM) such as synchronous DRAM (SDRAM), etc.), and a static memory 192 (e.g., flash memory, static random access memory (SRAM), etc.), which may communicate with each other via a data bus 194. Alternatively, the processing device 188 may be connected to the main memory 190 and/or static memory 192 directly or via some other connectivity means. The processing device 188 may be a controller, and the main memory 190 or static memory 192 may be any type of memory, each of which can be included in the monitoring unit, monitoring module #, listening unit #, and/or listening module # of FIGS. 2, 3, 6 and 7, for example.

The processing device 188 represents one or more general-purpose processing devices such as a microprocessor, central processing unit, or the like. More particularly, the processing device 188 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 188 is configured to execute processing logic in instructions 196 (located in the processing device 188 and/or the main memory 190) for performing the operations and steps discussed herein.

The computer system 186 may further include a network interface device 198. The computer system 186 also may or may not include an input 200 to receive input and selections to be communicated to the computer system 186 when executing instructions. The computer system 186 also may or may not include an output 202, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 186 may or may not include a data storage device 204 that includes instructions 206 stored in a computer-readable medium 208. The instructions 206 may also reside, completely or at least partially, within the main memory 190 and/or within the processing device 188 during execution thereof by the computer system 186, the main memory 190 and the processing device 188 also constituting the computer-readable medium 208. The instructions 196, 206 may further be transmitted or received over a network 178 via the network interface device 198.

While the computer-readable medium 208 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps that may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of monitoring non-supported wireless spectra within a coverage area of a wireless system, the method comprising:
    receiving, at a plurality of antennas, one or more electromagnetic signals;
    receiving, at a listening module connected to at least one of a plurality of remote units, the one or more electromagnetic signals from at least one of the plurality of antennas;

passing the one or more electromagnetic signals in a non-supported radio band different than a supported radio band of the wireless system to an output of the listening module; and transmitting the non-supported radio band from the output of the listening module over a communications medium of the wireless system, wherein the listening module comprises at least one mixer, at least one amplifier, and at least one filter configured to pass the non-supported radio band.

2. The method of claim 1, further comprising receiving, at at least one monitoring module of the wireless system, the non-supported radio band.

3. The method of claim 2, wherein each remote unit comprises at least one electrical-to-optical converter.

4. The method of claim 3, wherein each remote unit comprises at least one optical-to-electrical converter.

5. The method of claim 4, wherein the non-supported band is received at a head end of the wireless system.

6. The method of claim 3, wherein the communications medium comprises at least one optical fiber cable.

7. The method of claim 2, wherein the non-supported band is received at a head end of the wireless system.

8. The method of claim 7, wherein the communications medium comprises at least one optical fiber cable.

9. The method of claim 2, further comprising tuning the non-supported radio band.

10. The method of claim 1, further comprising:
tuning the non-supported radio band; and
attenuating the non-supported radio band.

11. A method of monitoring non-supported wireless spectra within a coverage area of a wireless system, the method comprising:
receiving, at a plurality of antennas, one or more electromagnetic signals;
receiving, at a listening module connected to at least one remote unit, the one or more electromagnetic signals from at least one of the plurality of antennas, the listening module comprising at least one filter;
passing the one or more electromagnetic signals in a non-supported radio band different than a supported radio band of the wireless system to an output of the listening module;
transmitting the non-supported radio band from the output of the listening module over a communications medium of the wireless system; and
receiving the non-supported band at at least one monitoring module.

12. The method of claim 11, further comprising tuning the non-supported radio band.

13. The method of claim 12, further comprising:
passing the non-supported radio band through an analog/digital converter in the listening module; and
attenuating the non-supported radio band.

14. A method of monitoring non-supported wireless spectra within a coverage area of a wireless system, the method comprising:
receiving, at at least one antenna, one or more electromagnetic signals;
receiving, at a listening module connected to at least one remote unit of the wireless system, the one or more electromagnetic signals from at the at least one antenna, the listening module comprising at least one filter;
filtering the one or more electronic signals in a non-supported radio band different than a supported radio band;
passing the non-supported radio band to an output of the listening module;
transmitting the non-supported radio band from the output of the listening module over a communications medium of the wireless system; and
receiving the non-supported band at at least one monitoring module.

15. The method of claim 14, further comprising passing the non-supported radio band through an analog/digital converter, wherein each remote unit comprises at least one optical-to-electrical converter and at least one electrical-to-optical converter, and wherein the communications medium comprises at least one optical fiber cable.

16. A method of monitoring non-supported wireless spectra within a coverage area of a distributed communication system having a fiber optic infrastructure, the method comprising:
receiving, at a plurality of antennas, one or more electromagnetic signals;
receiving, at a listening module connected to at least one of a plurality of remote units, the one or more electromagnetic signals from at least one of the plurality of antennas;
filtering one or more electromagnetic signals in a non-supported radio band different than a supported radio band of the system; and
passing the one or more electromagnetic signals in the non-supported radio band to an output of the listening module.

17. The method of claim 16, further comprising passing the non-supported radio band through an analog/digital converter, wherein each remote unit comprises at least one optical-to-electrical converter and at least one electrical-to-optical converter, and wherein the fiber optic infrastructure comprises a plurality of optical fiber cables.

18. The method of claim 17, further comprising receiving, at at least one monitoring module connected to head-end equipment of the system, the non-supported radio band via the fiber optic infrastructure, wherein the plurality of remote units are distributed throughout a building infrastructure having a plurality of floors such that each of the plurality of floors has at least one remote unit.

* * * * *

UNITED STATES PATENT AND TRADEMARK OFFICE
CERTIFICATE OF CORRECTION

PATENT NO. : 10,292,056 B2
APPLICATION NO. : 15/974007
DATED : May 14, 2019
INVENTOR(S) : Igor Berlin et al.

It is certified that error appears in the above-identified patent and that said Letters Patent is hereby corrected as shown below:

On page 8, Column 2, item (56), other publications, Line 17, delete "Solothum," and insert -- Solothurn, --, therefor.

On page 9, Column 2, item (56), other publications, Line 40, delete "n" and insert -- in --, therefor.

On page 9, Column 2, item (56), other publications, Line 48, delete "Transcations" and insert -- Transactions --, therefor.

On page 9, Column 2, item (56), other publications, Line 73, delete "Berkely," and insert -- Berkeley, --, therefor.

On page 10, Column 2, item (56), other publications, Line 13, delete "Jiatong" and insert -- Jiaotong --, therefor.

Signed and Sealed this
Twenty-fourth Day of March, 2020

Andrei Iancu
*Director of the United States Patent and Trademark Office*